June 2, 1959 J. G. QUINN 2,889,058
LAMINATION STACKING MACHINE
Filed March 27, 1957 3 Sheets-Sheet 3

INVENTOR:
JOSEPH G. QUINN
BY
HIS ATTORNEY

United States Patent Office 2,889,058
Patented June 2, 1959

2,889,058

LAMINATION STACKING MACHINE

Joseph G. Quinn, Schenectady, N.Y., assignor to General Electric Company, a corporation of New York Application March 27, 1957, Serial No. 648,852

11 Claims. (Cl. 214—6)

This invention relates to apparatus for more or less automatically depositing thin segmental laminations of magnetic material in a frame or cage member to form a "core," as for a dynamoelectric machine, transformer, or similar equipment.

Heretofore, the laminated magnetic stator cores of large dynamoelectric machines, for instance turbine-generators, have been assembled by placing the generator frame or casing with its axis vertical, building a scaffold within the frame, and having a number of workmen walk around and around the scaffold depositing the laminations by hand. The operation has required fairly skilled workmen, and the man-hours involved have represented a substantial portion of the labor content of a large generator. For instance, the stator of an 80,000 kw. turbine-generator may be on the order of 90 inches in outside diameter by 190 inches long, and may contain upwards of 200,000 lamination segments. Stacking the laminations in such a core may require on the order of 600 man-hours. Larger generators may take several men as long as four weeks to complete the lamination stacking operation.

Thus, it will be apparent that a substantial reduction in the cost of a large dynamoelectric machine may be effected with the aid of a machine for automatically depositing the laminations, at speeds substantially higher than human operators can achieve.

Accordingly, an object of the present invention is to provide novel apparatus for stacking the laminations in a large dynamoelectric machine core, reducing the human labor content to a small fraction of that required heretofore.

A further object is to provide lamination stacking mechanism making possible the completely automatic assembly of the laminations of a dynamoelectric machine.

Another object is to provide lamination stacking mechanism capable of depositing laminations at a higher rate of speed than a human operator, with only unskilled labor required to keep the machine supplied with laminations.

Figure 1:
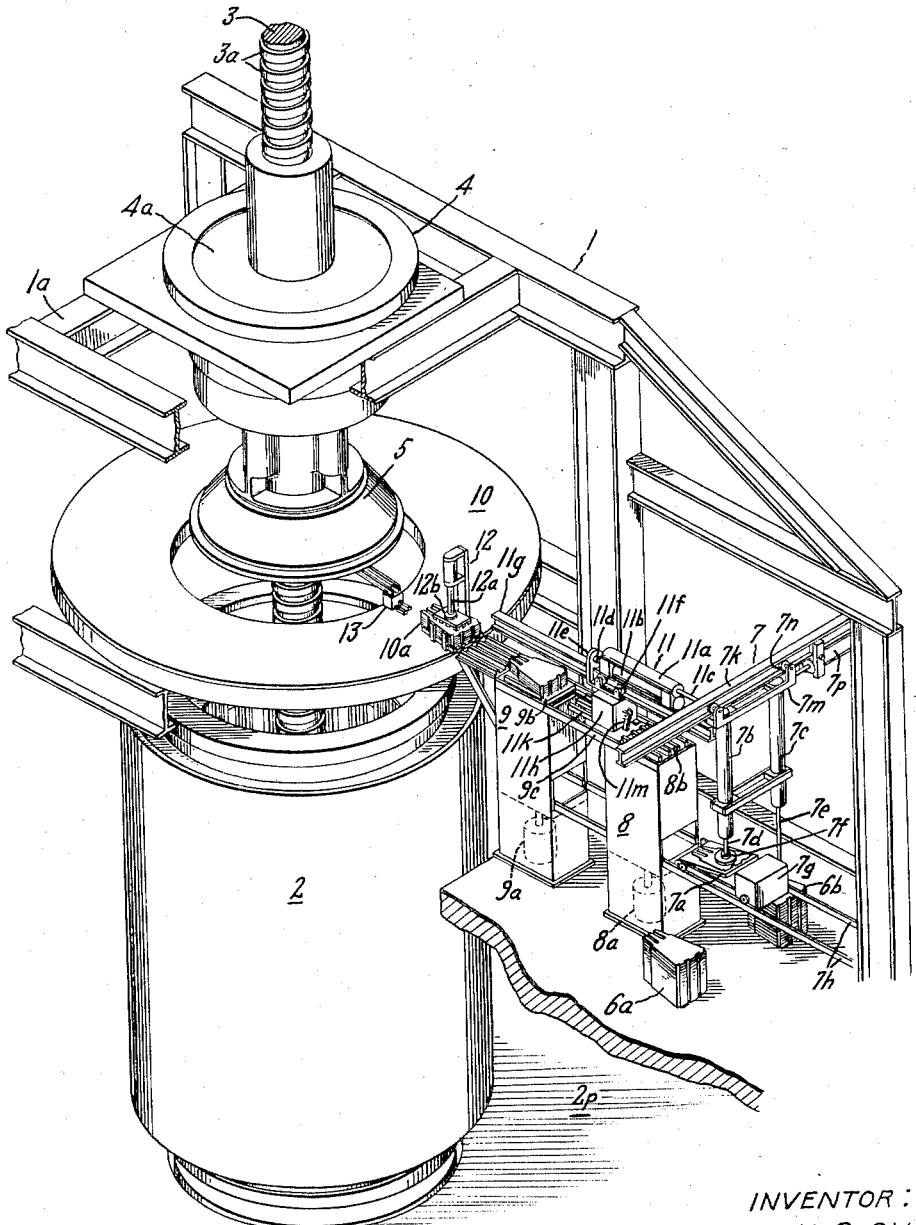
Figure 2:
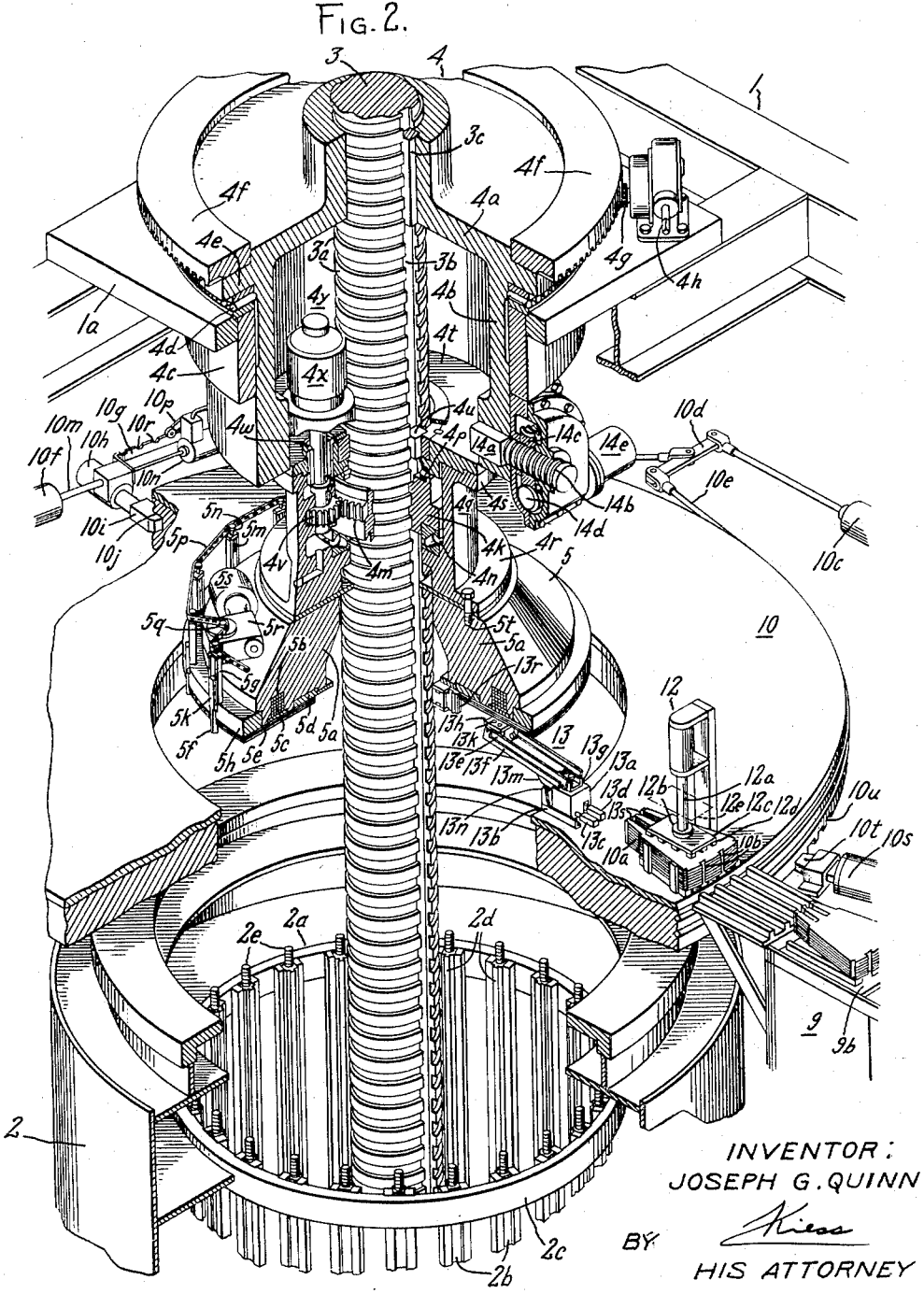
Figure 3:
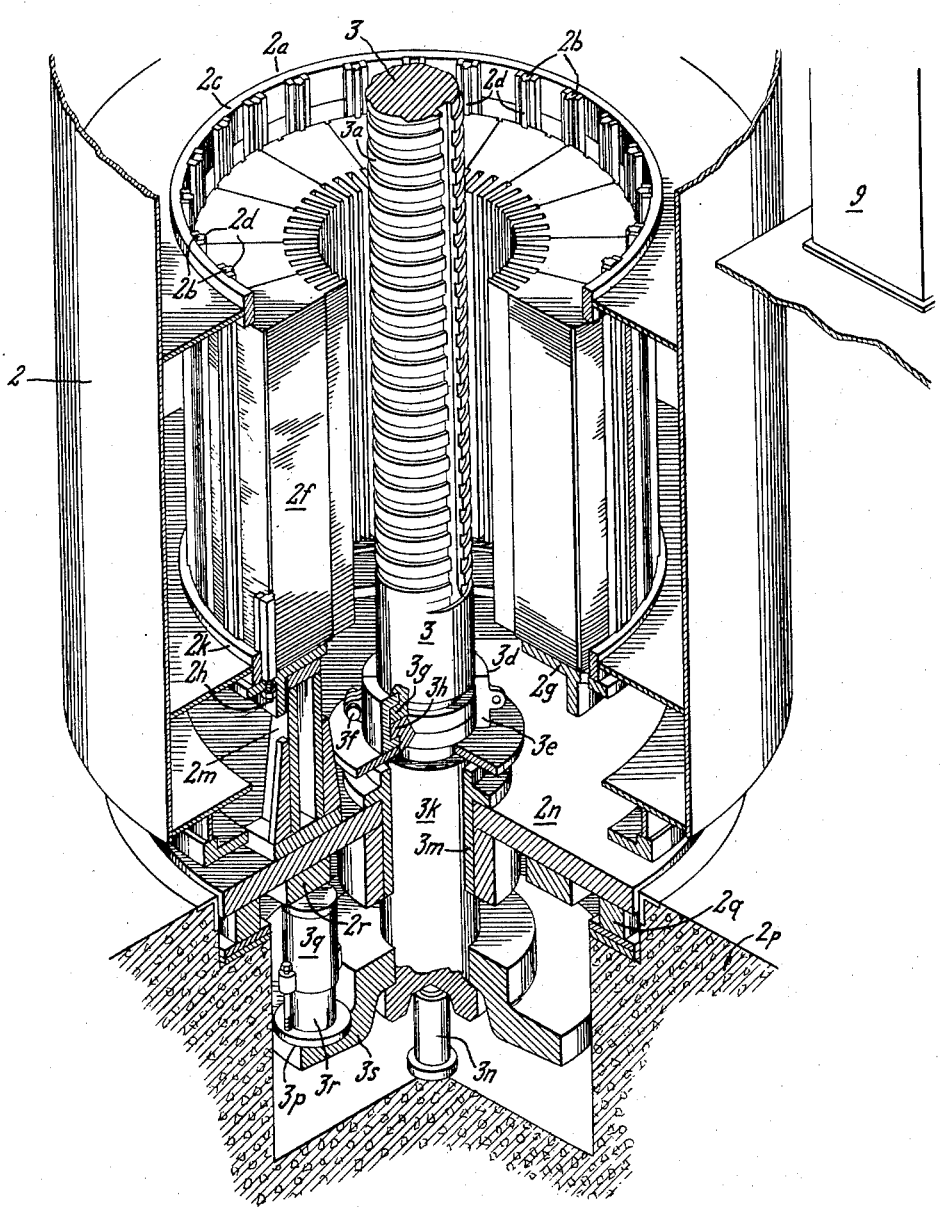

Other objects and advantages will become apparent from the following description, taken in connection with the accompanying drawings, in which Fig. 1 is a perspective view showing the general arrangement of one set of components of the complete apparatus;

Fig. 2 is an enlarged detail view of the upper portion of the machine with portions broken away; and Fig. 3 is an enlarged detail view of the lower portion of the apparatus with portions broken away to show interior details.

Generally stated, the invention is practiced by providing a lamination carriage member adapted to travel axially through the cage member in which the laminations are to be deposited, with means for biasing the carriage member relative to the cage so that the laminations can be firmly pressed into contact with laminations previously deposited, in order to squeeze out any air trapped between laminations, flatten the laminations in order to obtain best electrical characteristics, and reduce noise which otherwise results if a lamination is free to vibrate under the influence of electrical forces during operation.

Referring now more particularly to Fig. 1, the lamination stacking apparatus is illustrated as comprising a frame structure indicated generally at 1 built over a base or foundation 2p which supports with its axis vertical a generally cylindrical cage or casing 2. The foundation and framework for the apparatus is shown in abridged form since the details thereof form no part of this invention.

The lamination stacking machine proper consists generally of a central vertical column member 3 which projects entirely through the machine casing 2, with the upper end projecting a substantial distance above the casing. This upper end portion of the column 3 is disposed in suitable bearings contained in a bearing housing indicated generally at 4, which is of course suitably supported on the framework 1. Carried on the column 3 below the bearing housing 4 is an annular "lamination carriage ring" shown at 5. As will be seen more particularly hereinafter, the function of this carriage ring is to receive on its undersurface one or more annular rows of segmental laminations and to travel vertically down the column 3 to deposit these laminations in position in the core. The basic combination is completed by appropriate motor means for traversing the carriage ring 5, and motor means for biasing the carriage ring downwardly with substantial force to flatten the laminations and press out any air trapped therebetween. These motor means will be described more particularly in connection with Figs. 2 and 3.

In order to make the machine fully automatic, a substantial number of rather complex transfer devices are required to properly supply laminations around the periphery of the carriage ring 5 and to deposit them on the undersurface thereof. As shown diagrammatically in Fig. 1, this transfer mechanism may include the following components.

The primary storage for the supply of laminations is represented by the two large stacks shown at 6a, 6b, illustrated in Fig. 1 as supported on an elevated floor, above foundation 2p. More than one such stack is used, to speed up the transfer process, and also because a machine of this type may employ more than one type of lamination segment. In other words, the laminations in stack 6a may be of a slightly different design from those in stack 6b. Those acquainted with the dynamoelectric machine art will appreciate that there may be more than two types of laminations, and there will of course be a separate stack for each type. The disclosure in Fig. 1 is intended to indicate that the transfer mechanism makes it possible to count out and collate a plurality of different types of laminations into a bundle of a predetermined size.

It may be noted that the laminations are perhaps .01 to .03" thick and are stamped from a suitable grade of magnetic strip stock, then appropriately heat-treated, coated with enamel for electrical insulation from abutting laminations, etc. This processing inevitably results in some slight warping or buckling of the lamination.

The initial transfer device is represented at 7 as comprising a pair of motor driven rams for alternately picking up laminations from the respective stacks 6a, 6b and depositing them on a pallet 7a. More specifically, this transfer device includes hydraulic or pneumatic linear actuators 7b, 7c having reciprocable rod members 7d, 7e carrying at their lower ends an electromagnet or vacuum cup device 7f for attracting a single lamination.

A vacuum cup device may be preferred here, if the motive fluid for the motors 7b, 7c is air and it is desired to pick up only one lamination at a time. However, it will be appreciated that an electromagnet device of a design capable of picking up one or more laminations at a time may also be employed. The actuators 7b, 7c are carried on a frame 7m having rollers 7n travelling on the lower flange of an I-beam 7k, as positioned by an actuator 7p, the function of which is to properly align the respective pick-up devices 7f with the stacks of laminations 6a, 6b.

The pallet 7a is supported on a motorized carriage 7g, adapted to travel on rails 7h. Carriage 7g is arranged to travel from the position shown in Fig. 1 through the "pallet storage elevator" 8 and into the "bundle storage elevator" 9. The function of the pallet storage elevator 8 is broadly to return empty pallets downwardly and deposit them one at a time on the carriage 7g. The bundle storage elevator 9 serves to elevate the pallets one at a time for transfer to the annular storage table 10. The additional transfer mechanism by which these functions are performed will be seen from the following.

It will of course be appreciated that the pallet storage elevator 8 is provided with suitable motor means, shown in diagrammatic fashion at 8a as a linear actuator of any suitable fluid pressure motor type. Similarly, the bundle storage elevator 9 has a fluid pressure actuated motor shown in phantom lines at 9a. The mechanical details of these elevators are not necessary to an understanding of the present invention, since many equivalent elevating devices known to the art may be employed. It is only necessary to note that elevator 8 returns empty pallets downwardly and deposits them one at a time on the carriage 7g, while elevator 9 raises loaded pallets to the transfer mechanism now to be described.

Disposed across the top of elevators 8, 9 is a "transfer fork device" actuated by a fluid pressure actuator 11, which is actually a connected pair of hydraulic or pneumatic linear actuators, one shown at 11a and a second secured parallel thereto as shown at 11b. Motor 11a has a projecting piston rod 11c connected (by means not shown) to the frame rail 7k of the transfer device 7. The other linear actuator 11b has a piston rod projecting in the opposite direction from piston rod 11c, the extreme end portion of which is connected at 11d to the vertical leg 11e of an L-shaped frame the lower horizontal leg of which is provided with rollers 11f riding on the top surface of the lower flange of an I-beam monorail 11g. This rail 11g may be suitably secured to the framework of the transfer apparatus so as to be fixed in space relative to the support rail 7k.

The function of the L-frame member 11e is to support and transport a motorized "transfer fork" shown at 11h and having projecting fork tines 11k. It will be appreciated by those skilled in the materials handling art that the lamination-supporting pallets, one of which is shown in position at 8b at the top of the pallet storage elevator 8, have a plurality of longitudinally extending rib members so that the laminations are supported above the surface of the pallet with intermediate spaces defined between the ribs free to receive the tines 11k of the transfer fork device 11h. The function of the transfer fork device 11h is to pick up the bundle of laminations from the pallet 9b at the top of bundle storage elevator 9 and transfer the stack of laminations to the outer edge of the annular table 10. It is because of the extended motion required of the transfer fork device that the double linear actuator combination 11a, 11b is required. It will be apparent from Fig. 1 that, with this double motor combination, the required travel of the fork device 11h is effected with a compact actuator.

In addition to performing the function of transporting the bundle of laminations from the pallet 9b to the edge of table 10, the transfer fork carriage 11h also performs the function of moving the empty pallet from the top of elevator 9 back to the pallet return elevator 8. This may be effected, for instance, by a pivoted dog indicated at 11m as depending from the right-hand or rear side of the transfer device 11. This dog is so pivoted that it will engage the left-hand or front edge of the empty pallet at the top of elevator 9 and move it to the right along the rails 9c to the position indicated at 8b at the top of elevator 8. On the other hand, when the fork transfer device 11h moves to the left to transfer the bundle of laminations from pallet 9b to the edge of table 10, the pivoted dog 11m rotates upwardly so as to "ride over" the empty pallet, dropping again to engage the front or left-hand edge of the pallet for moving it back to position 8b.

The transfer means for moving the laminations one at a time from the stack at 10a on the outer circumference of table 10 to the under surface of the carriage ring 5 includes a pickup motor device shown generally at 12 and a "swinging arm transfer device," a portion of which can be seen at 13.

The function of the pickup device 12 is to elevate the laminations one at a time from the bundle 10a. To this end, the linear actuator 12 has a piston rod 12a carrying a suitable vacuum or electromagnetic pick-up device shown at 12b. The function of the swinging arm device 13 is to receive single laminations from the pickup device 12b and transfer them to the undersurface of the carriage ring 5. The details of how this is accomplished will be seen in more detail from subsequent description of the structure shown in Fig. 2.

Thus it will be seen that the transfer mechanism illustrated diagrammatically in Fig. 1 serves to receive one or more types of lamination from the storage piles 6a, 6b, etc., properly collate them into bundles of a predetermined number of laminations, transport the bundles by way of the storage elevator 9 to the level of the annular table 10, transport the bundles to the edge of table 10, and return the empty pallets to the storage elevator 8. Whereas only one complete combination of transfer devices is shown in Fig. 1, in order to make the apparatus work at maximum speed, there may be a number of sets of the transfer devices 7, 8, 9, 11, 12, 13 shown in Fig. 1, acting to continuously deposit on the outer circumference of the annular table 10 a circumferential row of bundles like that shown at 10a. It is contemplated that there will ordinarily be a complete annular row of the swinging arm transfer devices 13, the operation of which is so correlated that they can simultaneously swing to transfer single laminations from the respective storage bundles 10a to the undersurface of carriage ring 5. On the other hand, there may be only one set of devices corresponding to components 7, 8, 9, 11, in which case the table 10 will be appropriately indexed so these transfer devices can "feed" the annular row of devices 12. Only one complete set of transfer mechanisms is illustrated, because of the enormous complexity of the complete apparatus. It is believed obvious to those skilled in the art how the transfer mechanism shown generally in Fig. 1 may be multiplied around the circumference of the machine casing 2, as desired, to perform the functions specified.

Fig. 2 is a cutaway view of the upper portion of the mechanism, showing in more detail the transfer devices for moving the laminations singly from the collated bundle 10a to the undersurface of the lamination carriage ring 5. The operation of the feeder device 12 in lifting the laminations one at a time will be understood from the above description. However, here it can be seen more clearly that the pickup device 12b comprises a rectangular plate 12c having a plurality of suction cup devices 12d. These, of course, are connected to vacuum conduits (not shown) with an arrangement for making and breaking the vacuum so that the suction can be applied or released at will. Such vacuum transfer devices are common in the art and details need not be described further here since they form no part of the present invention.

The swinging arm transfer device 13 comprises a base member 13a disposed to slide radially relative to table 10 a short distance, guided by suitable rail or key means, represented in the drawing by the parallel rails or guide members 13b. The radial traverse of the base 13a is effected by a fluid-pressure linear actuator shown at 13c. This of course may be a pneumatic or hydraulic cylinder secured to the table 10 and having a ram connected to the base 13a. The swinging motion of this transfer device is effected by a second motor represented by the fluid pressure actuator 13d, supported by suitable bracket means (not shown) from the base 13a. The arm of the transfer device 13 comprises a parallelogram linkage consisting of two pairs of parallel arms 13e, 13f connected by suitable pivots to a bracket member 13g carried on the base 13a on a vertical pivot (not shown). The other end of the parallel arms 13e, 13f are pivoted to a platen 13h, provided with suction cups 13k (or equivalent electromagnetic devices) which of course also have appropriate release means.

The operation of the swinging arm transfer device 13 is as follows. With the platen 12c of the feeder device 12 in elevated position, as shown by dotted lines at 12e, the swinging arms 13e, 13f, rotates about its vertical pivot connection with base 13a so that the platen 13h comes under the lamination held by platen 12c. Then, breaking the vacuum on the cups 12d causes the lamination to be transferred from the feeder platen 12c to the transfer platen 13h, whereupon the suction cups 13k hold it in position. The motor 13d is then energized to cause the swinging arm to return to the position shown in Fig. 2, bringing the lamination under the lamination carriage ring 5. This motion must of course be effected with a certain vertical clearance space between the platen 13h and the undersurface of carriage ring 5. The result is that means must be provided for causing the platen 13h to travel vertically a short distance in order to bring the lamination against, or substantially against, the undersurface of carriage ring 5. This motion is produced in the following manner.

It will be seen in Fig. 2 that the undersurface of arm 13e is provided with a cam member 13m, which is adapted to be engaged by a cam follower roller 13n supported on a pedestal, which may be a bracket formed integral with the innermost end portion of the guide rail 13b, as shown in Fig. 2. With this cam and roller arrangement, radial inward travel of the base 13a, in accordance with the motion produced by motor 13c, causes an accompanying upward travel of the arms 13e, 13f. Thus, the shape of the cam 13m is made such that the path in space of the platen 13h will cause it to clear the lower surface of carriage ring 5 and any laminations previously deposited thereon and then elevate the lamination vertically, substantially into contact with the lower surface of ring 5 when the base 13a reaches its innermost position.

The detailed construction of the lamination carriage ring 5 will be seen from the following. Carriage ring 5 comprises a main frame member 5a of generally frustoconical construction having in its lower surface an annular recess 5b containing electrical conductors 5c forming an electromagnet, pole pieces of which are shown at 5d, 5h. It will be apparent that energization of the electromagnet 5c, 5d, 5h will cause the laminations, several layers of which are indicated at 5e, to be attracted to the bottom surface of the ring 5.

For accurately aligning the laminations 5e circumferentially relative to the ring 5, a plurality of sliding key devices 5f are disposed around the entire circumference of ring 5, although for purposes of simplification and clarity these keys are shown only on the left-hand portion of ring 5 in Fig. 2. Each key device comprises a channel-shaped guide member 5g secured to the outer annular pole piece 5h which is in turn suitably secured to the ring 5. Slidably disposed in each channel member 5g is a long rectangular key member 5k. Each of these keys is arranged to be simultaneously projected in a vertical direction downwardly relative to the ring 5h by a leadscrew 5m having at its upper end a sprocket 5n engaging a drive chain 5p, which of course goes completely around the circumference of the ring 5, and is driven by a main sprocket 5q through suitable gearing 5r by a reversible motor 5s. Thus it will be apparent that rotation of the motor 5s in one direction causes the keys 5k to simultaneously descend, while reverse rotation causes them to be retracted upwardly. These keys are intended to engage the notches provided in the outer periphery of the laminations, as shown at 10b in Fig. 2. Also, a ring member secured to the inner periphery of ring 5 has a plurality of spaced dovetail key portions 13r, which are adapted to engage the open ends of the slots 13s at the radially inner portion of the laminations 10a. These key means accurately align the laminations on the carriage ring 5.

Although it is difficult to see in Fig. 2 due to the small scale of the drawing, the retractible keys 5k actually have a somewhat pointed lower end, adapted to enter in an axial direction into the notches 10b in the laminations, so that any slight circumferential misalignment of a lamination being deposited will be corrected.

Means are also provided for indexing the lamination support table 10 in a circumferential direction. Actually, there are two separate indexing functions. One serves to index the table for successive stops at the position of the storage elevator 9, when only one set of transfer devices 7, 8, 9, 11 is provided for depositing a complete circumferential row of bundles around the circumference of table 10. This operation is performed while the lamination carriage ring 5 is down inside the cage depositing its load of laminations. The second indexing function is to move the table 10 circumferentially a small distance between succeeding layers of punchings, in order to provide a desired overlap of laminations, in order to improve the magnetic characteristics of the assembled core.

The first of the above-mentioned indexing functions is carried out by a hydraulic cylinder 10c (Fig. 2) which acts through a lever 10d to tighten a cable 10e wrapped around the periphery of the cable 10. When hydraulic cylinder 10c pulls on lever 10d, the cable 10e tightens on the periphery of table 10 and rotates it clockwise a preselected travel. The hydraulic motor 10c then stops and returns to its original condition, with the cable 10e slack. The next stroke of hydraulic motor 10c will move the table another like increment.

The second indexing function, for slightly staggering successive layers of laminations, is effected by the hydraulic motor 10f, cooperating with a "cam bar" 10g, and a second hydraulic motor 10h actuating a reciprocable key member 10i adapted to engage a notch 10j in the periphery of table 10. The hydraulic motor indicated generally at 10f is a double-acting motor having a piston rod 10m carrying the automatic locking device 10h, 10i. The cylinder 10f is carried on the fixed framework of the machine by suitable support means (not shown). The cam bar 10g is secured to the locking device 10h, as will be obvious from Fig. 2. Travel of the piston rod 10m is terminated by a valve 10n having a pivoted arm 10p with a cam follower roller adapted to drop into notches 10r in the upper edge of the bar 10g. These notches 10r are spaced according to the desired circumferential traverse of table 10, specifically the distance between adjacent notches 10b in the periphery of the laminations. Each time the cam follower roller drops into a notch 10r, the valve 10n discontinues operation of the hydraulic motor 10f. Lifting lever 10p causes motor 10f to move the piston rod 10m until the cam follower drops into the next notch 10r.

Thus it will be appreciated that the hydraulic motor 10f with the cam bar 10g and locking device 10h, 10i effect positioning of table 10 so as to cause successive layers of laminations to overlap by a desired degree. Another hydraulic cylinder 10s projects a tapered locking key member 10t into a notch 10u to accurately locate and lock the table 10 while the transfer devices 12, 13 deposit laminations in appropriate overlapping relation on the magnetic lamination carriage ring 5. The locating and locking motor 10s is of course energized to project the key 10t each time the actuating arm 10p of valve 10n drops into a notch 10r, being energized to retract key 10t each time lever 10p is raised to traverse table 10 to the next notch. When the last notches 10r, 10u are reached, the double-acting motor 10f is energized to return table 10 to the original position. With the number of notches shown in the periphery of laminations 10a in the drawings, there will ordinarily be only four notches 10u in the table rim, and four corresponding notches in cam bar 10g.

The lower portion of Fig. 2 shows the outer casing of the generator stator 2 cut away to reveal the inner cage assembly 2a which forms the main frame for receiving the laminations. This cage comprises a plurality of axially extending "key bars" 2b supported in circumferentially spaced relation by being welded to a plurality of circumferential rings, one of which is shown at 2c, and one at 2k (in Fig. 3). Each bar has a longitudinally extending key portion 2d, adapted to engage the notches 10b in the outer periphery of the laminations. For tightly compressing and retaining the assembled stack of laminations, each key bar is provided with a threaded stud end portion 2e, adapted to project through an end retainer ring member (not shown). (A similar retaining ring member is shown at 2g in Fig. 3, as described hereinafter.)

The central column 3 which forms the "monorail" on which the lamination carriage ring 5 travels, may be on the order of 20 inches in diameter and upwards of 40 feet long. At the lower end, it is supported and secured by means described hereinafter in connection with Fig. 3; and its upper end is received in, and keyed to rotate with, an upper bearing housing 4 having an end disk portion 4a and a depending cylindrical portion 4b. This cylindrical portion 4b serves as a guide bearing, rotating in a cylindrical bearing shell 4c welded to the framework 1a. The weight of the central column and carriage ring assembly is carried on a roller thrust bearing 4d disposed between the frame member 1a and a circumferential radially extending portion 4e of the end disk member 4.

For orienting the bearing housing 4 in a circumferential direction, indexing means are provided, which may take the form of a ring gear 4f having teeth engaged by a suitable gear 4g adapted to be rotated by a wrench or crank applied at 4h, or by remote control by equivalent gear-motor means (not shown). This orientation will ordinarily be determined during initial setup of the machine, and not disturbed thereafter. During operation, the indexing mechanism 10c, 10d, etc. serves to shift the table 10 so as to determine the circumferential orientation of the laminations and carriage ring 5, relative to the key bars 2b.

Fig. 2 also shows in detail the motor means for traversing the lamination carriage ring axially on the central column 3. To this end, the column is provided throughout its axial length with a helical thread 3a. This thread is engaged by an annular nut member 4k having an outer ring gear 4m. The ring nut member 4k rotates in a lower conical roller thrust bearing 4n and an upper roller thrust bearing 4p. These bearings are retained in an inner bearing housing 4q, having a lower flange portion 4r to which the frusto-conical lamination carriage ring 5a is secured, as by threaded fastenings 5t. The upper end of housing 4q has a flange portion 4s to which is secured an end plate assembly 4t which carries a key member 4u. Key 4u engages a longitudinal keyway 3b extending the entire length of the column 3. The upper end of this keyway contains a key 3c arranged to locate the bearing housing 4 relative to the column 3.

The column is caused to be raised and lowered in the bearing housing 4 by rotation of the ring nut 4k, which is effected by a drive pinion 4v journaled in a bearing 4w supported in the upper end plate assembly 4t and driven by a suitable motor 4x. It will of course be appreciated that motor 4x is reversible. Since the column 3 is keyed at 3c to the bearing housing 4, and to the inner bearing housing 4q by the key 4u, rotation of the nut 4k by motor 4x will cause the lamination carriage ring 5 and its associated bearing and support housing 4q to descend and rise on the column 3, without rotation of the lamination carriage ring, except as effected by the indexing mechanism 4g, 4h.

It remains to note that the outermost diameter of the inner bearing housing assembly 4q is small enough that it may rise into the recess 4y defined within the upper portion of the bearing housing skirt portion 4b. It will be seen that the clearance between the upper end of motor 4x and the end disk 4a determines the extent of this vertical travel. For positively retaining the housing assembly 4q in such elevated condition within the recess 4y, a remotely actuated key device is provided. This comprises one or more square key members 14a having a threaded end portion 14b carried in a nut member 14c having gear teeth on its outer circumference engaged by a worm gear 14d driven by a suitable reversible motor 14e. It will be apparent that rotation of motor 14e will cause the key 14a to move radially. The operation of this device is that when the inner bearing housing 4q is elevated into the space 4y, the keys 14a are driven radially inward by motor 14e so as to engage the undersurface of the bearing housing end flange 4s. Thus these keys positively retain the housing 4q in elevated position on the column 3, for reasons which will appear hereinafter from the description of the integrated method of operation.

Fig. 3 shows the frame and core cut away to illustrate the lower half of the central column, with the bearing and hydraulic motor means associated with the lower end thereof. In this view, it will be seen that the stack of laminations 2f is substantially completed. It will also be observed that the lower end clamping ring 2g is secured by the threaded studs 2h to the key bars 2d, which are in turn welded to the circumferential frame ring 2k secured to the casing 2. It is to be particularly noted that the generator casing 2 and cage structure 2a is supported during the stacking operation by a plurality of circumferentially spaced pedestals, only one of which is shown at 2m. The generator casing and frame structure rests on the lower end retaining ring 2g. The pedestals 2m are carried on a floor plate 2n which is in turn supported on the foundation 2p by a ring 2q.

The central column 3 terminates at a lower end coupling assembly indicated generally at 3d. This comprises a segmental clamping ring 3e the segments of which are secured together by fastening means 3f. Ring 3d is channel-shaped in cross-section and engages abutting flange portion 3g formed on the lower end of column 3, and flange 3h on the adjacent end of a lower stub shaft identified 3k. The stub shaft 3k is supported in a journal bearing 3m carried on the floor plate 2n in a manner which will be obvious from the drawing. It is to be noted that this stub shaft slides axially, as well as being free to rotate, in the bearing 3m.

Two hydraulic motors are associated with the lower end of the column 3 and floor plate assembly. The first motor identified 3n is a hydraulic "lifting ram," the function of which is to raise and lower the stub shaft 3k, for reasons which will be noted more particularly in the method of operation described below. The other hydraulic motor comprises two or more circumferentially spaced "pressing rams," only one of which appears at 3p. Each of these rams includes a cylinder 3q having an upper end abutting against a ring member 2r secured to the undersurface of floor plate 2n. The moving ram of the hydraulic motor, identified 3r, abuts against the outer circumferential portion of a heavy flange member 3s carried on the lower end of the stub shaft 3k.

The general operation of these fluid pressure motors may be stated as follows. The central lifting ram $3n$ is effective to raise and lower the stub shaft $3k$ and column 3. When the column is raised, the flange $3s$ carries the ram $3r$ of the pressing rams upwardly to the top of their stroke in cylinder $3q$. On the other hand, when operating liquid is supplied to the pressing ram cylinders $3q$ (with the lifting ram $3n$ de-energized) downward motion of the rams $3r$ relative to the cylinders $3q$ will cause the stub shaft $3k$ and column 3 to be biased downwardly relative to the floor plate $2n$. It will be seen that this has the effect of causing the lamination carriage ring 5 to be strongly biased downwardly to compress the laminations $2f$ against the lower end ring $2g$. Thus it will be seen that the lifting ram $3n$ is more or less a positioning device while the circumferential row of rams $3p$ perform the function of strongly compressing the laminations to flatten them, force out any air trapped between, etc. The purpose of the coupling $3d$ is to permit the column 3 to be removed, for insertion and removal of the generator cage and frame.

The operation of this lamination stacking machine may be outlined briefly as follows. The first step is to count out and collate the bundles of laminations to be supplied to the annular table 10. As indicated above, the one or more types of laminations which make up the core of the generator are represented by the two stacks $6a$, $6b$ in Fig. 1. The collation of the laminations into bundles may be accomplished by suitable program control mechanism (not shown) which causes the motors $7t$, $7c$, $7p$ to pick up laminations from the two stacks and deposit them in proper order on the pallet $7a$. When the bundle, of perhaps 200 or 300 laminations, is accumulated, the rams of the counting motors $7b$, $7c$ rise out of the way and the pallet transfer device $7g$ pushes pallet $7a$ on the rails $7h$ through the pallet storage elevator 8 and into the bundle storage elevator 9.

The bundle storage elevator motor $9a$ then raises the bundle of laminations to the position shown in Fig. 1 at $9b$. Actually, the bundle storage elevator $9a$ will contain a number of prepared bundles of laminations disposed vertically one above the other, a new bundle being fed in by the pallet transfer device $7g$ as one is removed from the top by the fork transfer device $11h$.

The fork transfer motor $11h$ actuates the bundle lift fork so that the tines $11k$ enter the spaces between the longitudinal ribs on the pallet, elevate the bundle of laminations slightly from the pallet and transport it radially inward to the position shown at $10a$ below the ram of the feeder device 12, and deposit the laminations in the position shown at $10a$ in Figs. 1 and 2. Upon the return motion of the fork transfer device, the pivoted dog $11m$ engages the empty pallet at the top of elevator 9 and pushes it to the right on the rails $9c$ to the position shown at $8b$. Thus it is in position to return down the pallet storage elevator to be re-used.

The ram $12a$ of the feeder device 12 is now actuated, by the program control mechanism, to pick up one lamination at a time from the bundle $10a$, elevating each lamination to the position shown in dotted lines at $12e$ in Fig. 2. The swinging motor $13d$ of the lamination transfer device 13 is now actuated by the program control mechanism to cause the parallelogram arm $13e$, $13f$ to rotate about its vertical axis, so the platen $13h$ is positioned under the suspended lamination $12e$. The ram $12a$ of the feeder device 12 now descends to deposit the lamination on the transfer platen $13h$ of the swinging arm transfer device. The vacuum in the suction cups $12d$ is now broken to release the lamination from the feeder device. Simultaneously, vacuum is applied to the ports $13k$ of the transfer platen $13h$, to secure the lamination thereto. The swinging motor $13d$ is now energized to return the arm of the transfer device about its vertical axis to the position shown in Fig. 2. Thereafter, actuation of the other motor $13c$ causes the base $13a$ of the transfer mechanism to move radially to the left so that the cam mechanism $13m$, $13n$ causes the parallelogram arms $13e$, $13f$ to rise slightly. This elevation of platen $13h$ brings the slot portions $13s$ into alignment with the dovetail key ring $13r$, and the lamination moves into contact, or substantially into contact, against the pole pieces $5d$ of the electromagnet carried by ring 5. Meanwhile, the key drive motor $5s$ has been energized to position the keys $5f$ downwardly so as to project below the pole pieces $5d$, $5h$ by an amount corresponding to the thickness of the load of laminations to be carried at one time by ring 5, so that upward movement of the lamination brings the notches $10b$ into alignment on the keys $5f$. It may be noted in passing that in appropriate cases the very complex slidable key means $5f$ may be eliminated, and the inner peripheral fixed dovetail key ring $13r$ relied on to align the laminations on the ring 5.

It must now be noted that the electromagnet of the lamination carriage ring 5 is variably energized by a complex electrical control system (not shown) so that it never exerts a pull sufficient to attract the lamination away from the vacuum platen $13h$. That is, the vacuum on the ports $13h$ must be broken before the pull of the electromagnet is sufficient to attract the lamination to the undersurface of ring 5. After each circumferential row of laminations is installed, the electrical control mechanism automatically increases the excitation of the electromagnet $5c$, $5d$ by an amount just sufficient to retain the multiple rows of laminations on the electromagnet, yet without exerting sufficient pull to attract the next lamination away from the vacuum platen $13h$ until the vacuum is broken. Thus each succeeding row of laminations may be very accurately positioned in proper circumferential orientation on the undersurface of ring 5 so that the circumferential edge notches $10b$ will be properly aligned on the projecting key members $5f$, $13r$.

During the operation just described, the other analogous feeder devices similar to 12 (not shown) have been supplying laminations to corresponding transfer devices similar to that shown at 13, and these have been simultaneously applied to the under surface of ring 5. Thus, it is intended that a complete circumferential row of laminations is deposited substantially simultaneously.

The table indexing mechanism $10f$, $10h$, $10n$, $10s$, $10u$, etc., is now actuated to index table 10 circumferentially by a distance equal to that between two adjacent edge notches $10b$ in the laminations. The cycle is then repeated to deposit another row of laminations, the distance by which the table is indexed each time being an even fraction of the distance between adjacent key bars $2d$, so that the laminations overlap in desired sequence. In general, there will be from two to four peripheral notches $10b$ in the laminations corresponding to the circumferential distance between adjacent key-bars $2d$.

This process is repeated until all laminations in all the bundles $10a$ on the table 10 have been deposited on the undersurface of the lamination carriage ring 5.

With the lamination transfer devices 13 retracted out of the way, the motor $4x$ is energized, to rotate nut $4k$ and drive the carriage ring assembly 5 downwardly on column 3, moving the ring of laminations toward the key bars $2b$. During this process, the key positioning motor $5s$ drives the circumferential row of aligning keys $5f$ upwardly in a manner to leave the aligned notches in the outer periphery of the laminations free to be engaged by the keys $2d$ of the bars $2b$. When the machine is initially set up, the upper bearing housing $4b$ is oriented circumferentially, by means of the indexing device $4g$, so that when the carriage ring 5 descends, the dovetail notches $10b$ in the periphery of the laminations will accurately align with the key portions $2d$ of the generator cage structure. Carriage ring 5 travels down through the cage structure $2a$ carrying the ring of laminations to the lowermost end of the generator core. The first bundle of laminations are of course deposited on the lower clamping ring 2g (Fig. 3). The motor 4x may be energized until the laminations carried by ring 5 actually engage the lower clamping ring 2g (or the laminations previously deposited). Then of course the motor 4x tends to stall and the current therein increases, until an overcurrent relay (not shown) associated with the circuit of motor 4x trips the controlling mechanism to stop motor 4x, simultaneously signalling the program control mechanism to cut off the power to the electromagnet coil 5c, with the result that the ring of laminations is released. The program control mechanism then re-energizes motor 4x for the reverse direction of rotation, to cause the carriage ring 5 to traverse upwardly on column 3.

During the operation just described, table 10 will have been indexed circumferentially by the mechanism 10c, 10d, 10e and the transfer fork device 11h will have deposited fresh bundles of laminations in position under the circumferential row of feeder devices 12. The process repeats until a stack of laminations of a predetermined height has been deposited in the generator cage structure 2a. For instance, this stack of laminations may be perhaps 30 inches high.

At this time, the newly deposited laminations are firmly pressed together in the following manner. With the carriage ring 5 remaining in its lowermost position in contact with the top lamination, and with the current to the electromagnet coil 5c cut off, the hydraulic fluid is exhausted from the lifting ram 3n (Fig. 3), which thereupon retracts downwardly away from the lower end of stub shaft 3k. The multiple pressing rams 3p are then supplied with motive fluid so as to force the flange 3s downwardly relative to the floor plate 2n. As noted before, this causes the laminations to be tightly compressed, with a force which may be perhaps 400 to 800 tons. This insures that all laminations are perfectly flat and in optimum contact, having also the important effect of expelling air from between them. The motive fluid supply to the pressing rams is then discontinued and the lifting ram 3n is energized to raise the stub shaft 3k and column 3 so that the lamination carriage ring 5 rises away from the stack of laminations. In going to the top of its stroke, the lifting ram 3n causes the pressing rams 3p to return to the top end of their stroke, ready for the next pressing operation. The lamination carriage ring 5 then traverses upwardly on the column 3 and the cycle repeats for another series of laminations. This pressing operation is repeated at appropriate intervals, as required to squeeze out any air trapped between laminations and flatten any warped pieces.

When the pile of laminations reaches the top of the key bars 2b, the carriage ring 5 and the column 3 are removed as follows. The motor 4x is energized to cause the bearing housing 4q to rise into the chamber 4y defined within the upper bearing housing 4b. As noted before, when in this position, the locking key members 14a can be positioned radially inwardly by energizing the motor 14e so that the keys 14a engage beneath the flange 4s. Thus the bearing housing and carriage ring assembly is positively supported in elevated position in the recess 4y.

The coupling 3d at the lower end of column 3 is now disengaged by removing the threaded fastenings 3f, after which the motor 4x is energized to cause the nut 4k to rotate so as to raise column 3 in the nut. The column 3 is of course elevated sufficiently as to clear the generator frame 2. The generator stator 2 with the laminations installed may then be removed. It is of course necessary to apply the top lamination retaining ring, analogous to the ring 2g at the bottom end of the generator and assemble the nuts to the threaded stud end portions 2e. The upper generator clamping ring is not shown in the drawings since this phase of the assembly operation will be obvious to those acquainted with the art.

By employing a suitable complement of transfer devices for depositing collated bundles of laminations on the outer edge of table 10, and by having an appropriate program control equipment for causing all these interrelated processes to occur in proper sequence, the lamination stacking process can be accomplished much faster and better than with human operators.

The control equipment required for dictating the sequence of these numerous interrelated functions will be of an exceedingly complex nature. It is believed that control engineers acquainted with the art will readily perceive how many equivalent pneumatic, hydraulic, and electrical control devices may be employed to cause the machine components described herein to perform the process outlined above. These control devices and their precise manner of interconnection and interrelation do not form a part of my invention and are therefore not described herein.

As noted previously, the elevators and transfer mechanism shown in Fig. 1 are intended to be diagrammatic representations of one arrangement which might be used; and those skilled in the art will appreciate that many equivalent devices may be used for collating and depositing the bundles of laminations on the table 10. As a matter of fact, it would be entirely possible to have this function performed manually by unskilled labor, the invention being employed only to substitute the unskilled labor of porters for the more highly skilled labor required for previous methods of manually stacking the laminations on the key bars. It will be obvious that the full benefits of the invention, from the standpoint of saving labor and increasing the speed of the stacking operation, will be achieved by full mechanization as suggested herein. By the same token, the control mechanism for properly correlating the many functions performed by the transfer and traversing motors could be performed by one or more operators throwing switches and turning valves in the appropriate sequence, but this will preferably be effected by a complex program controlling mechanism, such as a magnetic tape device dictating through appropriate electrical circuits the sequence in which the functions are to be performed.

Those acquainted with the art will appreciate that countless modifications might be made without departing from the essence of the invention. For instance, the lifting and pressing functions might be performed by a common hydraulic motor arrangement replacing the lifting ram 3n and the pressing rams 3p. It is also conceivable that a single motor associated with the lamination carriage ring 5 might perform both the traversing function and the pressing function. Also, the number of swinging arm transfer devices 13 may be smaller than the number of laminations in a complete annular row, and the indexing mechanism 10c, 10d, 10e may be actuated to cause the devices 13 to deposit adjacent laminations in sequence, rather than simultaneously. Theoretically, it would of course be possible to have only a single set of transfer devices, precisely as illustrated in Fig. 1, the indexing mechanism being employed to traverse the table 10 through 360 degrees, in steps, so as to permit the transfer mechanism to deposit a complete annular row of laminations, sequentially.

It is of course intended to cover by the appended claims all such modifications and equivalents as fall within the true spirit and scope of the invention.

What I claim as new and desire to secure by Letters Patent of the United States is:

1. In a machine for stacking thin laminations in a cage structure, the combination of frame means adapted to support with its axis vertical a cage member in which the laminations are to be deposited, said cage member having an abutment portion at its lower end, a central vertical column member disposed within and having an end portion projecting from at least the upper end of said cage member, a lamination carriage ring disposed around said column member, means on said carriage ring for retaining at least one layer of laminations on the under surface thereof, motor means for traversing said carriage ring vertically along the column and through the cage member, and motor means for biasing said carriage ring downwardly relative to the cage member whereby the carriage ring compresses laminations carried thereby downwardly toward said abutment portion of the cage member and against laminations previously deposited.

2. A lamination stacking machine in accordance with claim 1 and including an annular table disposed above the upper end of the cage member and so located as to surround the annular carriage ring member when in an elevated position, means for depositing bundles of laminations on said table member, and means for transferring said laminations to the undersurface of the carriage ring member.

3. A lamination stacking machine in accordance with claim 2 and including means for indexing the annular table circumferentially, whereby succeeding annular rows of laminations may be disposed in staggered relation, with the laminations in each row bridging the joints between the laminations in the next adjacent rows.

4. A lamination stacking machine in accordance with claim 2 in which the lamination transferring means comprises first motor means for elevating a lamination from the lamination bundle on the annular table, and means including a pivoted arm member adapted to swing about a vertical axis for transferring said lamination from said first motor means to the undersurface of the lamination carriage ring.

5. A lamination stacking machine in accordance with claim 2 in which the means for depositing bundles of laminations on the annular table member comprises a plurality of motor driven pickup devices for picking up at least one lamination at a time from a plurality of storage stacks and depositing them in sequence on a transfer pallet, first bundle elevator means for traversing each pallet with a bundle of laminations to the level of said annular table member, second pallet storage elevator means for returning empty pallets to said pick-up devices, pallet transfer means for moving a loaded pallet to the bundle storage elevator, and transfer fork means for picking up the bundle of laminations from the pallet at the top of the bundle storage elevator and transferring said bundle to the edge of the annular table, said transfer fork means being also effective upon its return to move the empty pallet to the top of the pallet storage elevator.

6. A lamination stacking machine in accordance with claim 1 and including a plurality of projectable key members spaced circumferentially around the periphery of the lamination carriage ring, and motor means carried by said carriage ring and connected to project said key members downwardly from the carriage ring, whereby said keys enter notches in the circumference of the lamination segments to effect accurate circumferential alignment thereof.

7. A lamination stacking machine in accordance with claim 1 and including a first cylindrical housing defining a central cylindrical recess, thrust bearing means supporting said first housing on the frame of the machine, a second cylindrical housing surrounding the central column and carrying the carriage ring member and traversing motor means and being of an outside diameter of a size to enter said cylindrical recess in the first housing, the traversing motor means being effective to move said second housing upwardly into said cylindrical recess in the first housing, and means for retaining the second housing in said recess of the first housing, whereupon the traversing motor means may be actuated to move the central vertical column member upwardly and out of the cage structure, to permit insertion and removal of the latter.

8. A lamination stacking machine in accordance with claim 7 and including means for indexing the first bearing housing member circumferentially on the machine frame through at least a limited arc for orienting the carriage ring member circumferentially relative to the cage member.

9. In a machine for stacking thin segmental laminations in a cylindrical cage structure, the combination of frame means adapted to support with its axis vertical a cylindrical cage member in which the laminations are to be deposited, said cage member having an annular abutment portion at its lower end, a central column member disposed vertically within and having an end portion projecting from at least the upper end of said cage member, a lamination carriage ring disposed around said column member, means on said carriage ring for retainnig at least one layer of laminations on the undersurface thereof, motor means for traversing said carriage ring through the cage member to a plurality of positions spaced vertically along the column, and motor means for biasing said column downwardly relative to the cage member, whereby the carriage ring compresses laminations carried thereby downwardly and tightly against laminations previously deposited on said annular abutment portion of the cage member.

10. A lamination stacking machine in accordance with claim 9 in which the means for biasing the carriage ring downwardly towards the cage abutment portion comprises first fluid pressure motor means for elevating the column relative to the cage member, and second fluid pressure motor means disposed to bias the column downwardly relative to said abutment portion.

11. A lamination stacking machine in accordance with claim 10 in which the central column member comprises a first major portion adapted to extend through the cage structure and having a helical lead screw for traversing the lamination carriage ring axially thereon, said central column having a second minor lower end portion with which the first elevating motor means and the second biasing motor means are associated, and coupling means for disconnecting said first major column portion from said second minor column portion whereby said first column portion and the lamination carriage ring may be elevated for insertion and removal of the cylindrical cage member.

References Cited in the file of this patent

UNITED STATES PATENTS

| 2,352,369 | Carew | June 27, 1944 |
| 2,609,108 | Peterson et al. | Sept. 2, 1952 |
| 2,765,599 | Johnson | Oct. 9, 1956 |